C. W. SALADEE.
Vehicle Springs.
No. 148,504. Patented March 10, 1874.
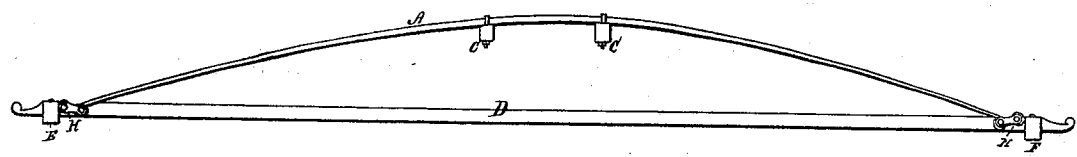
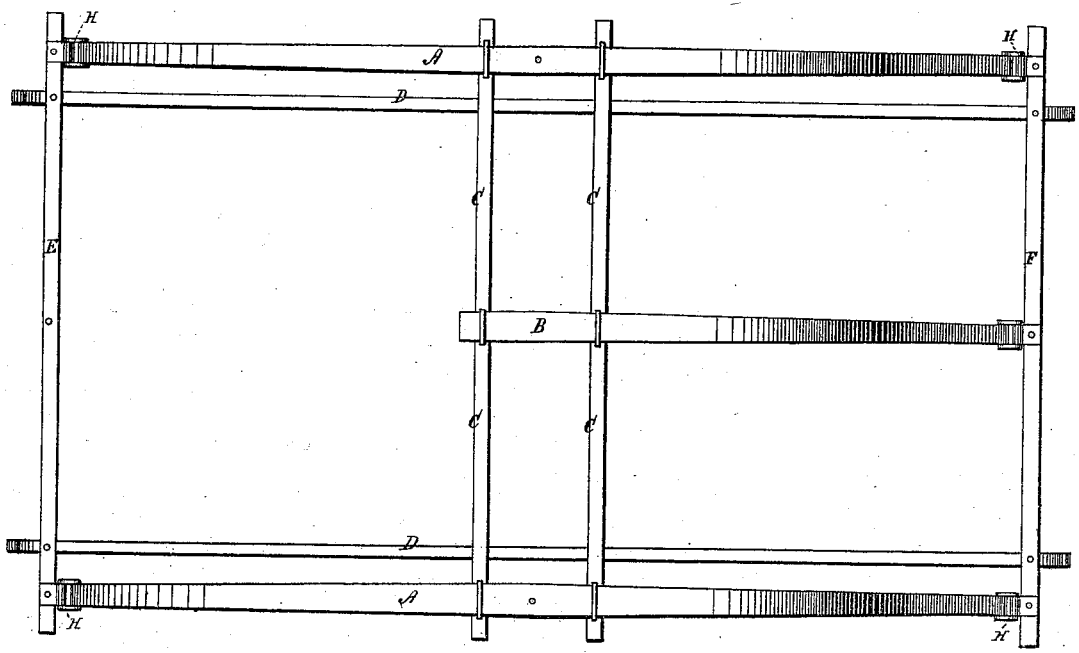
WITNESSES.
INVENTOR.

UNITED STATES PATENT OFFICE.

CYRUS W. SALADEE, OF PITTSBURG, PENNSYLVANIA.

IMPROVEMENT IN VEHICLE-SPRINGS.

Specification forming part of Letters Patent No. 148,504, dated March 10, 1874; application filed February 6, 1874.

*To all whom it may concern:*

Be it known that I, CYRUS W. SALADEE, of Pittsburg, State of Pennsylvania, have invented a certain Improvement in Side Springs for Vehicles, of which the following is a specification embodying my said invention:

My present invention relates to that class of business and pleasure vehicles whose gearings are constructed with half-elliptic side springs; and consists in providing one or more intermediate rear half-springs, for the purpose of imparting greater strength to the rear half of the springs than to the front half of the same. This improvement becomes necessary from the fact that in all single-seat buggies the center of the seat is always back of the cross-center of the side springs and gearing, and consequently the weight of two persons on the seat imposes a much greater strain upon the rear half of the two half-elliptic side springs than on the front half, and the result is that the body is depressed at the rear end and elevated at the front, which defect is not only unsightly, but uncomfortable to the rider. To obviate this defect I interpose one or more intermediate rear half-springs, as stated above.

In the drawing—a plan view—A and A represent a top view of two ordinary half-elliptic side springs, secured in front to the bolster E, and to the rear axle F by means of links H, in the usual way, and the bolster and rear axle may or may not be connected by side perches D and D in any of the well-known methods of doing the same with or without perch. Cross-bars C and C may be clipped or bolted to the under side of the springs A and A, as plainly seen in the drawings; or, in the absence of these cross-bars, the body of the vehicle may be bolted directly to the cross-center of the springs A and A, in the usual way. The half of a side spring, B, similar in curvature to the outside springs A from their cross-center to the end, is interposed between the springs A and A, as seen. The front end of this rear half-spring B is secured to the cross-bars C and C, as shown in the drawing, while the rear end is hinged to the rear axle F, same as the outside springs, or in any other way that will allow free action to the rear end of spring B.

It will now be easily understood, from a glance at the drawing, that there is more resisting spring force from the cross-center of the gearing to the rear axle than there is from that point to the front axle or bolster, by reason of the intermediate rear half-spring B, and that in this manner the unequal strain imposed on the rear half of the springs, as already shown, is provided for. It will also be understood, as a matter of course, that one or more of these intermediate springs B may be interposed, as circumstances may require.

In all cases where the cross-bars C and C are dispensed with, and the body of the vehicle is secured directly to the side springs A, the front end of the intermediate spring B is in that case secured to the bottom of the body by any means that will securely hold the same in position.

I am fully aware that intermediate springs between the two outside springs A and A have been employed, but extending the full length of the gearing, the same as the outside springs A, and thus presenting as much spring force in front as in the rear of the cross-center of the gearing, and thereby failing of the object attained in my invention. I therefore limit my claim to intermediate springs extending from the cross-center of the gearing to the rear axles, as already clearly shown and described.

I claim as my invention—

One or more intermediate springs, B, extending from the cross-center of the gearing to the rear axle, in combination with half-elliptic side springs A, substantially as and for the purpose set forth.

CYRUS W. SALADEE.

Witnesses:
CHARLES W. SALADEE,
G. B. SALADEE.